United States Patent [19]

West

[11] Patent Number: 5,656,583

[45] Date of Patent: Aug. 12, 1997

[54] FILTER POUCH CLEANER AND METHOD FOR CLEANING COFFEE OR TEA MAKER

[75] Inventor: Steve F. West, Upland, Calif.

[73] Assignee: Coffee Dispenser Cleaner Company, LLC, Orange, Calif.

[21] Appl. No.: 568,607

[22] Filed: Dec. 5, 1995

[51] Int. Cl.[6] .......................... C11D 17/00; C11D 7/56; B08B 9/00; B08B 3/04
[52] U.S. Cl. ................ 510/439; 510/218; 510/219; 510/378; 510/509; 510/512; 134/22.17; 134/35; 134/42
[58] Field of Search ................ 510/439, 109, 510/218, 219, 297, 243, 378, 509, 511, 512; 134/22.1, 22.16, 22.17, 35, 42

[56] References Cited

U.S. PATENT DOCUMENTS

| | | | |
|---|---|---|---|
| 2,037,566 | 4/1936 | Durgin | 510/218 |
| 2,788,328 | 4/1957 | Merget | 510/219 |
| 3,058,916 | 10/1962 | Sinner et al. | 510/378 |
| 3,763,047 | 10/1973 | Fairs | 252/99 |
| 4,063,893 | 12/1977 | Stouul et al. | 23/230 R |
| 4,410,441 | 10/1983 | Davies et al. | 510/277 |
| 4,861,511 | 8/1989 | Kaplan | 252/174.23 |
| 5,227,084 | 7/1993 | Martens et al. | 252/95 |
| 5,234,615 | 8/1993 | Gladpelter et al. | 510/218 |
| 5,384,364 | 1/1995 | Besse et al. | 252/90 |

*Primary Examiner*—Paul Lieberman
*Assistant Examiner*—Lorna M. Douyon
*Attorney, Agent, or Firm*—Lyon & Lyon LLP

[57] ABSTRACT

A filter pouch cleaner for cleaning coffee and tea makers, has a top and bottom filter layer made from tea bag paper. The top and bottom filter layers are joined together along and adjacent to their outer edges to form a sealed pouch therebetween. The pouch is filled with a powdered cleaner compound that includes trisodium phosphate, sodium metasillicate and sodium perborate, along with soda ash as a filler. To facilitate the biodegradability and the safety of the cleaner compound, tripolyphosphate and a trace of blue dye powder are included in the cleaner compound.

15 Claims, 4 Drawing Sheets

FILTER POUCH CLEANER AND METHOD FOR CLEANING COFFEE OR TEA MAKER

FIELD OF THE INVENTION

This invention relates to coffee and tea makers, and more particularly to a filter pouch cleaner that facilitates the cleaning of the brewing and dispensing equipment of a tea or coffee maker.

BACKGROUND OF THE INVENTION

Millions of cups of coffee and tea are brewed and consumed each and every day. As each pot of coffee or tea is brewed, the brewing cycle releases coffee and tannin oils from the coffee and tea. These oils are deposited as a brown oily residue on the coffee and tea makers' brewing and dispensing equipment. The oily residue tends be acidic and, thus, tends to sour the taste of the coffee or tea, especially when the residue is left to build up over a long period of time. Thus, it is desirable to clean the brewing and dispensing equipment, i.e., the brew basket, pot or server, spouts, sight glass, etc., to avoid brewing harsh or sour tasting coffee or tea.

Currently, cleaning procedures vary from using salt and ice to using bleach. Many liquid commercial cleaners have been developed for glass decanters, airpots, and glass lined thermal servers. Powders such as urn cleaners have also been developed. These powders usually comes in bulk supply, which requires the user to measure an amount to be used, or may come in a measured amount in an envelope. The user will normally, in the case of a liquid cleaner, squeeze a soft plastic bottle with a tilt top closure into the pot or server and, in the case of a powder, merely place the loose powder into an open filter in the brew basket, and then add hot water or run the brew cycle to activate the concentration of the cleaner. In either case, using these cleaners to clean the coffee or tea makers is less than convenient since it requires a certain amount of manipulation and, in some cases, measurement of the cleaner.

Also, these cleaners commonly include such harsh chemicals as hypochlorite. Hypochlorite has a chlorine bleach smell that may linger after the cleaner is used.

For safety reasons, some of the liquid cleaners include a coloring dye to indicate that the liquid in the pot or dispenser contains a cleaning agent.

In view of the foregoing, it would be desirable to have a coffee or tea maker cleaner that comes in a convenient, ready-to-use (RTU) configuration, that does not include harsh chemicals that leave a chlorine bleach smell, and that includes a coloring dye for safety reasons.

SUMMARY OF THE INVENTION

The filter pouch cleaner of the present invention serves to conveniently clean a coffee or tea maker. It preferably has a top filter layer and a bottom filter layer that are constructed out of tea bag paper. The top and bottom filter layers are joined together along and adjacent their outer edges forming a sealed cavity between the top and bottom filter layers. The cavity of the filter pouch cleaner is preferably filled with a powdered cleaner compound which preferably includes trisodium phosphate, soda ash, sodium metasilicate, sodium perborate, tripolyphosphate, and a trace of blue dye powder.

An object of this invention is to provide an improved filter pouch cleaner for coffee and tea makers.

Further objects and advantages of the present invention will become apparent from a consideration of the drawings and ensuing description.

DESCRIPTION OF THE PREFERRED EMBODIMENT

Figure 1:
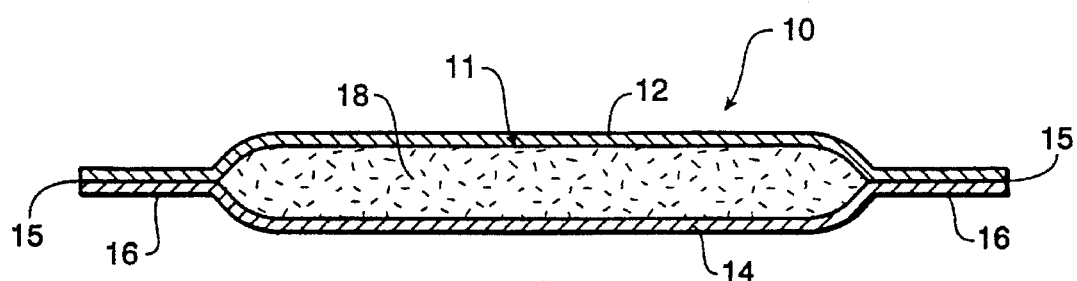
FIG. 1 is a cross-sectional view of a filter pouch cleaner of the present invention taken along a line 1—1 in FIG. 2.
Figure 2:
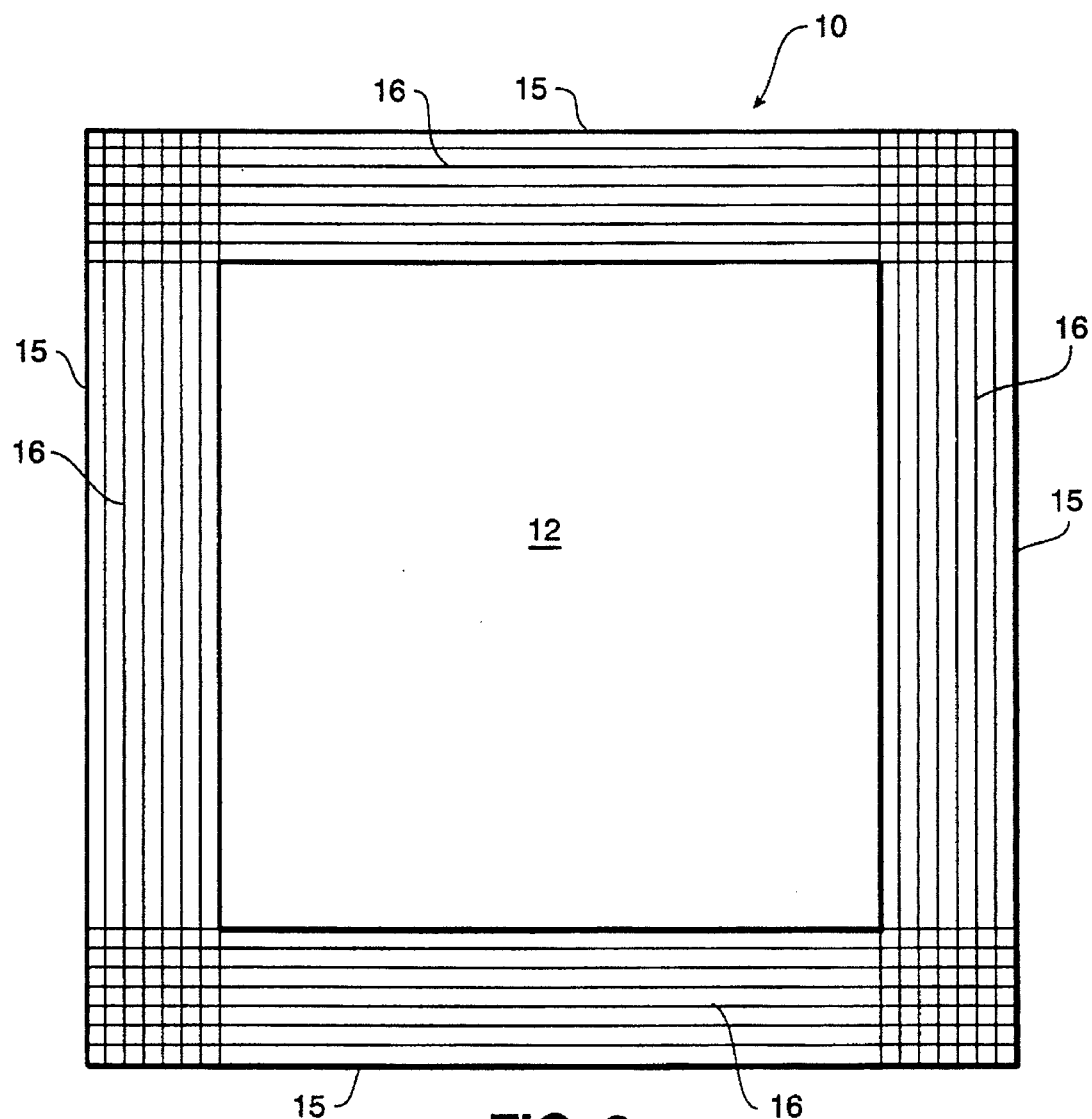
FIG. 2 is a top view of a filter pouch cleaner of the present invention.
Figure 3:
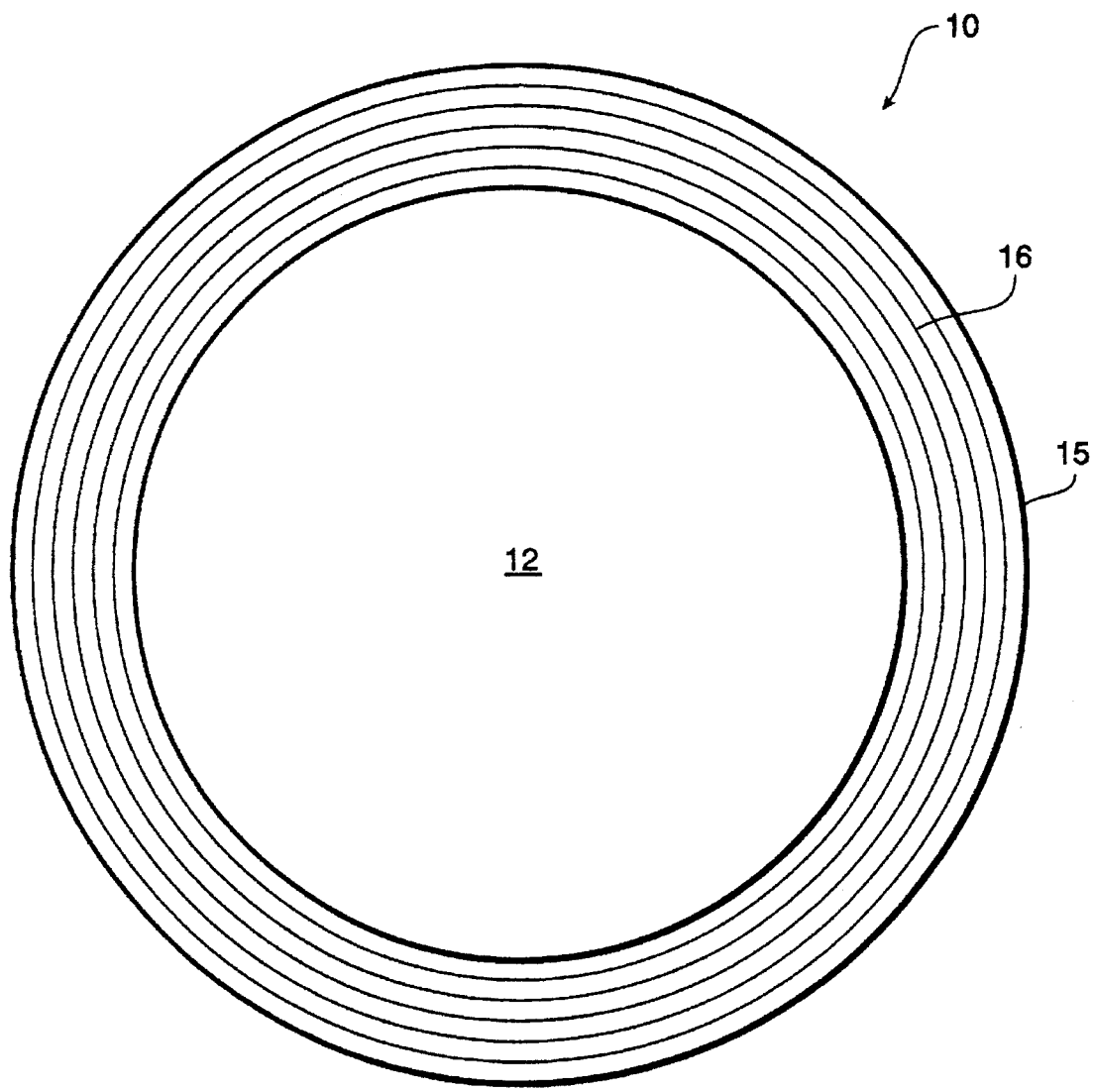
FIG. 3 is a top view of an alternate embodiment of a filter pouch cleaner of the present invention.

Referring now in detail to the drawings, therein illustrated is a novel filter pouch cleaner 10 of the present invention. Referring to FIGS. 1–3, the filter pouch cleaner 10 is shown to comprise a filter pouch 11 which includes a top filter layer 12 and a bottom filter layer 14. As shown in FIGS. 2 and 3 respectively, the top and bottom filter layers 12 and 14 are preferably substantially square or circular in shape. The top and bottom layers 12 and 14 are joined together preferably by forming a seal 16 along and adjacent their edges 15. The seal 16 forms a sealed cavity 17 substantially centered between the top and bottom layers 12 and 14. The cavity 17 is preferably filled with a pre-measured amount of powdered cleaner compound 18 prior to sealing the top and bottom layers 12 and 14. A universal machine, known in the art and commonly referred to as a form-fill-seal machine, is typically used to heat seal the top and bottom filter layers 12 and 14 to form the filter pouch 11 and fill the same with a pre-measured amount of the cleaner compound 18.

The filter layers 12 and 14 are preferably constructed from grade 533 or 25.0 gsm tea bag paper. By utilizing tea bag paper, or equivalent material, the filter pouch 11 acts as a storage device for the powdered cleaner compound 18 prior to use and as a filter to undissolved solid particles of the cleaner compound 18 during cleaning operations. As with a conventional tea bag, liquids, such as water, can pass through the tea bag paper, but dry or solid particles substantially do not pass through the tea bag paper. Since dry or solid particles are substantially prevented from passing through the filter layers 12 and 14, the likelihood of such particles getting trapped in the coffee or tea maker equipment and salting the taste of the coffee or tea, is substantially diminished. Thus, the configuration of filter pouch cleaner 10 provides the user with a ready-to-use (RTU) cleaning element. Moreover, the user is not required to measure any amount of cleaner or tear open any envelopes of pre-measured amounts of cleaner to effectively use the filter pouch cleaner 10 of the present invention.

Referring now to the powdered cleaner compound 18, it preferably comprises complex sodium based chemicals commonly found in soap and detergent in varying concentrations. More particularly, the cleaner compound 18 comprises two heavy duty non-toxic cleaning chemicals, i.e., trisodium phosphate and sodium metasilicate. Trisodium phosphate and sodium metasilicate are chemicals that are highly alkaline, i.e., PH values of 11–13. Because trisodium phosphate and sodium metasilicate are highly alkaline they react strongly with the acidic residue from the coffee and tannin oils and, thus, act as extremely effective cleaning agents.

The cleaner compound 18 also includes a natural chemical filler such as soda ash. Soda ash is preferable because of its effervescent quality. Soda ash foams when it is combined with water and thus, aids in the washing process. By foaming, the soda ash helps dissolve the cleaner compound 18 in the water and put the cleaning chemicals in contact with the surfaces to be cleaned. In addition, the soda ash's foaming action helps lift the residue off of the surfaces being cleaned.

Other chemicals included in the cleaner compound 18 are sodium perborate and tripolyphosphate. Sodium perborate is preferably included in the cleaner compound 18 because of its bleaching and sanitizing qualities. Tripolyphosphate is preferably included in the cleaner compound 18 because it improves the cleaning action of the compound in hard water, i.e., it tends to soften the water, but more importantly, it assists in making the cleaner compound more biodegradable.

Preferably, the chemicals of the cleaner compound 18 are combined, as a percentage of the total weight of the cleaner compound 18, in the following manner:

| | |
|---|---|
| 27–33% | Trisodium Phosphate |
| 36–44% | Soda Ash |
| 9–11% | Sodium metasilicate |
| 4–6% | Sodium Perborate |
| 13–17% | Tripolyphosphate |
| Trace | Dye Powder |
| 100% | |

This preferred combination of chemicals tends to eliminate any smell associated with the cleaner compound 18 before or after cleaning the coffee or tea maker, tends to keep coffee or tea dispensing mechanisms cleaner, and tends to bleach glass and plastic components of the coffee and tee makers for a bright and clear appearance.

The dye included in the cleaner compound 18 enables the user to easily determine that the coffee or tea maker is being cleaned and that the liquid in the server or dispenser contains the cleaner compound 18. It is preferable to use a dye that sustains its color and does not fade while suspended in a solution having a high pH value, such as keyamine torquoise 6. This blue dye powder preferably turns blue then green when it is mixed with the coffee and tannin oils from coffee and tea.

Preferably, about eighty to ninety grams of the cleaner compound 18 is filled into the cavity 17 of the filter pouch 11 to clean a three gallon size coffee or tea maker, about 21 grams of the cleaner compound 18 is filled into the cavity 17 of the filter pouch 11 to clean 75 ounce or ½ gallon size coffee or tea makers, and seven to ten grams of the cleaner compound 18 is filled into the cavity 17 of the filter pouch 11 to clean a four cup size coffee or tea maker.

In operation, the packaging configuration of the filter pouch cleaner 10 enables it to be used in substantially all known coffee and tea brewing environments. Due to the vast number of different coffee and tea makers, a generic coffee maker 20, as shown in FIG. 4, will be used, for exemplary purposes only, to illustrate the operation of the filter pouch cleaner 10.

Figure 4:
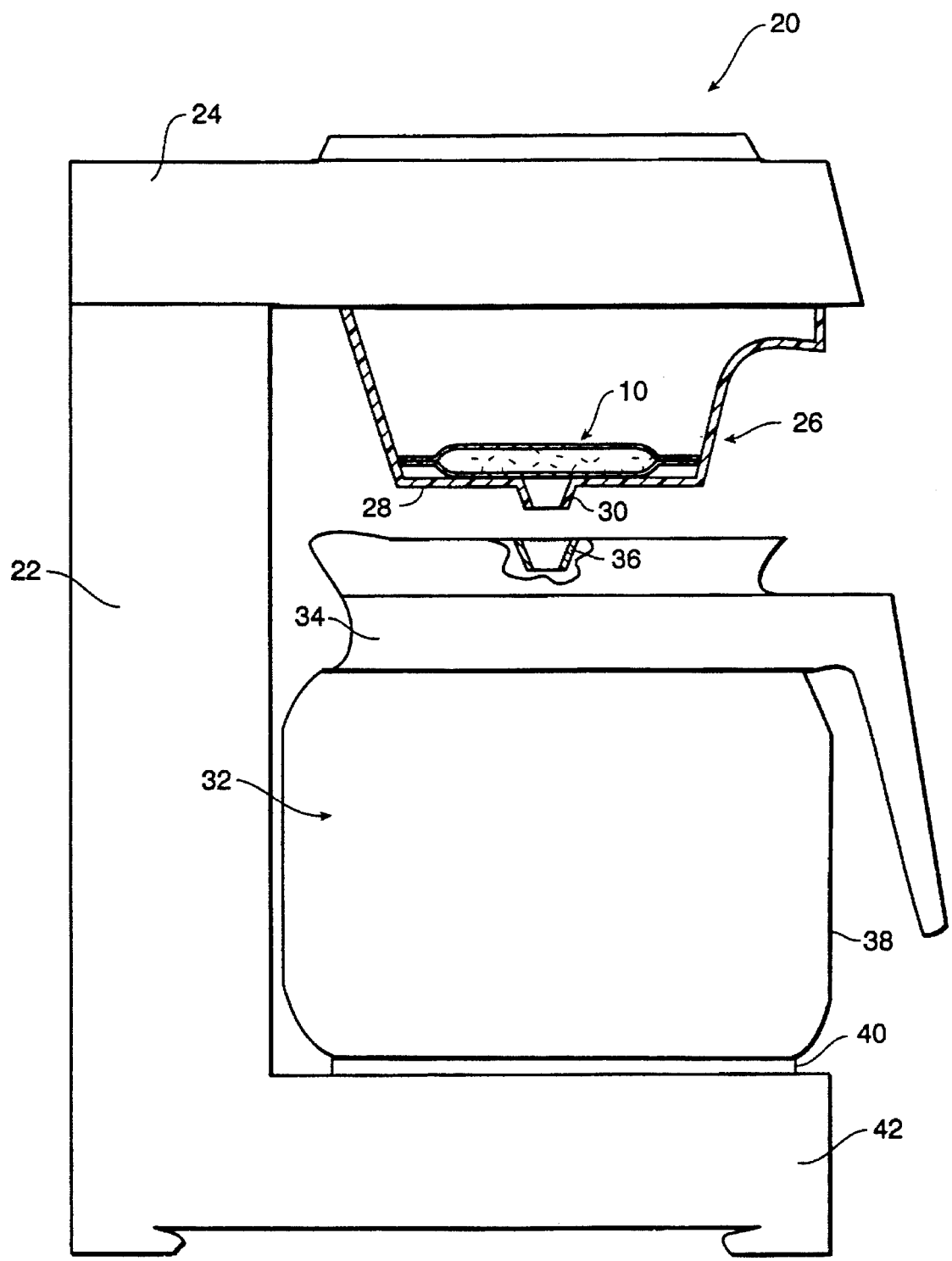
FIG. 4 is a plan view of a typical coffee maker including a partial sectional view of a brew basket and a filter pouch cleaner.

Turning to FIG. 4, a coffee maker 20 is shown to comprise a water reservoir 22, a water delivery component 24 operably coupled to the water reservoir 22, a brew basket 26 attached to and below the water delivery component 24, a heating element 40 mounted on top of a base 42 and a coffee pot or server 32 removably mounted on top of the heating element 40 and interposed between the heating element 40 and the brew basket 26. During the coffee brew cycle, oils from the coffee tend to collect as a residue in the brew basket 26, on the brew basket's spout 30, on a receiving spout 36 in a lid 34 on the coffee pot 32 and on the coffee pot's 32 glass reservoir 38. To clean these items, the filter pouch cleaner 10 is simply taken in its RTU configuration, i.e., the filter pouch 11 is left in tact and is not torn open, and placed in the brew basket 26 substantially centered on the base 28 of the brew basket 26. However, prior to placing the filter pouch cleaner 10 into the brew basket 26, it is preferable to substantially spread out the cleaner compound 18 within the cavity 17 of the filter pouch 11. The user can spread the cleaner compound 18 out by placing the filter pouch cleaner 10 in a substantially flat manner onto the substantially flat and horizontally oriented palm of his or her hand, and then gently bounce or shake the filter pouch cleaner 10 atop of his or her hand until the cleaner compound 18 is substantially evenly distributed within the cavity 17.

Once the filter pouch cleaner 10 is in place within the brew basket 26, the normal brew cycle of the coffee maker 20 is run. Hot water enters and fills the brew basket 26 from the water delivery component 24. The water soaks through the filter layers 12 and 14 of the filter pouch 11 and dissolves the cleaner compound 18. Once dissolved, the effervescent soda ash begins foaming and thus mixing the cleaner compound 18 with the water and putting the other chemicals in contact with the surfaces to be cleaned. The filter pouch cleaner 10 advantageously cleans, bleaches and sanitizes more than one piece of the coffee maker 20 at the same time during the brew cycle. Thus, when the brew cycle is complete, the brew basket 26, the brew basket's spout 30, the spout 36 in the lid 34 of the coffee pot 32, and the glass reservoir 38 of the coffee pot 32 are cleaned, bleached and sanitized. The filter pouch 11 of the filter pouch cleaner 10 is then conveniently tossed into the trash.

Figure 5:
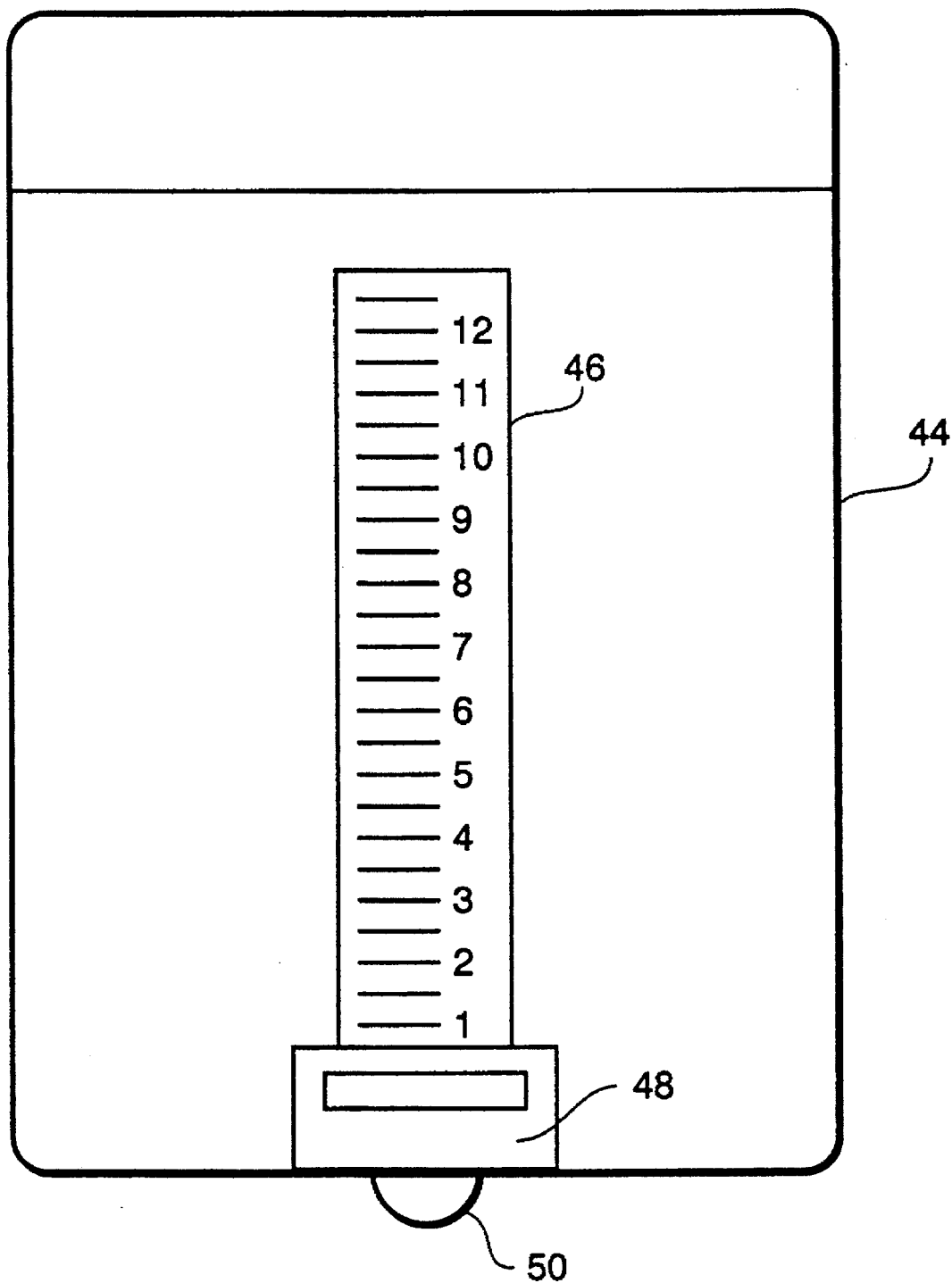
FIG. 5 is a plan view of a typical thermal coffee or tea server.

Similarly, a site glass 46, a dispensing mechanism 48, a spout 50 and the surfaces of an internal chamber of a typical thermal coffee server 44, as shown in FIG. 5, will be cleaned, bleached and sanitized at the end of a brew cycle.

Also during the brew or cleaning cycle, the liquid in the pot 32 will advantageously appear blue and then green as a result of the blue coloring dye in the cleaner compound 18 mixing with the oils from the coffee. This blue and green coloring indicates to the user that the coffee maker 20 is being cleaned and, thus, will tend to diminish the likelihood that the user will mistake the liquid in the pot 32 for coffee.

While the above description contains many specificities, these should not be construed as limitations on the scope of the invention, but rather as an exemplification of one preferred embodiment thereof. Other variations are possible.

Accordingly, the scope of the present invention should be determined not by the embodiments illustrated above, but by the appended claims and their legal equivalents.

What is claimed is:

1. A filter pouch cleaner for coffee or tea dispensers comprising
    a top filter layer,
    a bottom filter layer joined to said top filter layer along and adjacent to an outer edge of said top and bottom filter layers forming a sealed cavity therebetween, and
    a cleaner compound received and retained in said sealed cavity, said cleaner compound consisting essentially of trisodium phosphate in a concentration of about 27–33% by weight, soda ash in a concentration of about 36–44% by weight, sodium metasilicate in a concentration of about 9–11% by weight, sodium perborate in a concentration of about 4–6% by weight, and tripolyphosphate in a concentration of about 13–17% by weight.

2. The filter pouch cleaner of claim 1, wherein said cleaner compound further comprises a trace amount of coloring dye.

3. A method for cleaning a coffee or tea maker's brewbasket and dispenser comprising the steps of placing a filter pouch cleaner in a brewbasket for a coffee or tea maker, said filter pouch cleaner comprising a top filter layer, a bottom filter layer joined to said top filter layer along and adjacent to an outer edge of said top and bottom filter layers forming a sealed cavity therebetween, and a cleaner compound received and retained in said sealed cavity, said cleaner compound consisting essentially of trisodium phosphate in a concentration of about 27–33% by weight, soda ash in a concentration of about 36–44% by weight, sodium metasilicate in a concentration of about 9–11% by weight, sodium perborate in a concentration of about 4–6% by weight, and tripolyphosphate in a concentration of about 13–17% by weight, positioning the brewbasket with the filter pouch cleaner in place on the coffee or tea maker to run a normal brew cycle, positioning a dispenser beneath the brewbasket, and running the normal brew cycle of the coffee or tea maker.

4. The method of claim 3, further comprising the step of discarding the depleted filter pouch cleaner upon the completion of the brew cycle.

5. The method of claim 3, further comprising the steps of filling the brewbasket with hot brew cycle water, soaking the brew cycle water through the filter layers of the filter pouch cleaner, and dissolving the cleaner compound.

6. The method of claim 5, further comprising the step of filling the dispenser with brew cycle water and dissolved cleaner compound as it drains through the filter pouch cleaner and out of the brewbasket.

7. The method of claim 6, further comprising the step of mixing the cleaner compound in the brew cycle water.

8. The method of claim 7, further comprising the steps of contacting the interior surfaces of the brewbasket and dispenser with the dissolved cleaner compound and cleaning the interior surfaces of the brewbasket and dispenser.

9. The method of claim 8, further comprising the step of discarding the depleted filter pouch cleaner.

10. A method for cleaning a coffee or tea maker's brewbasket and dispenser comprising the step of placing a filter pouch cleaner in a brewbasket, said filter pouch cleaner comprising a top filter layer, a bottom filter layer joined to said top filter layer along and adjacent to an outer edge of said top and bottom filter layers forming a sealed cavity therebetween, and a cleaner compound received and retained in said sealed cavity, said cleaner compound consisting essentially of trisodium phosphate in a concentration of about 27–33% by weight, soda ash in a concentration of about 36–44% by weight, sodium metasilicate in a concentration of about 9–11% by weight, sodium perborate in a concentration of about 4–6% by weight, and tripolyphosphate in a concentration of about 13–17% by weight, positioning the brewbasket and filter pouch cleaner above a dispenser, filling the brewbasket with hot brew cycle water, and soaking brew cycle water through the filter pouch and out of the brewbasket to fill the dispenser.

11. The method of claim 10, further comprising the step of mounting the brewbasket with the filter pouch cleaner on the coffee or tea maker to run a normal brew cycle.

12. The method of claim 10, further comprising the steps of dissolving the cleaner compound, and mixing the cleaner compound in the brew cycle water.

13. The method of claim 12, further comprising the step of filling the dispenser with brew cycle water and dissolved cleaner compound as it drains through the filter pouch cleaner and out of the brewbasket.

14. The method of claim 13, further comprising the steps of contacting the interior surfaces of the brewbasket and dispenser with the dissolved cleaner compound, and cleaning the interior surfaces of the brewbasket and dispenser.

15. A method for cleaning a coffee maker's brewbasket and associated dispenser comprising the steps of placing a filter pouch cleaner in a brewbasket of a coffee maker, said filter pouch cleaner comprising a top filter layer, a bottom filter layer joined to said top filter layer along and adjacent to an outer edge of said top and bottom filter layers forming a sealed cavity therebetween, and a cleaner compound received and retained in said sealed cavity, said cleaner compound consisting essentially of trisodium phosphate in a concentration of about 27–33% by weight, soda ash in a concentration of about 36–44% by weight, sodium metasilicate in a concentration of about 9–11% by weight, sodium perborate in a concentration of about 4–6% by weight, and tripolyphosphate in a concentration of about 13–17% by weight, mounting the brewbasket with the filter pouch cleaner in place on the coffee maker, positioning a dispenser beneath the brewbasket, filling the brewbasket with hot brew cycle water, soaking the brew cycle water through the filter layers of the filter pouch cleaner, and dissolving the cleaner compound, filling the dispenser with brew cycle water and dissolved cleaner compound as it drains through the filter pouch cleaner and out of the brewbasket, mixing the cleaner compound in the brew cycle water, contacting the interior surfaces of the brewbasket and dispenser with the dissolved cleaner compound, cleaning the interior surfaces of the brewbasket and dispenser, and discarding the depleted filter pouch of the filter pouch cleaner.

\* \* \* \* \*